Aug. 16, 1949.  G. A. BOECK ET AL  2,479,465
CONTROL DEVICE
Filed Jan. 4, 1947  4 Sheets-Sheet 1
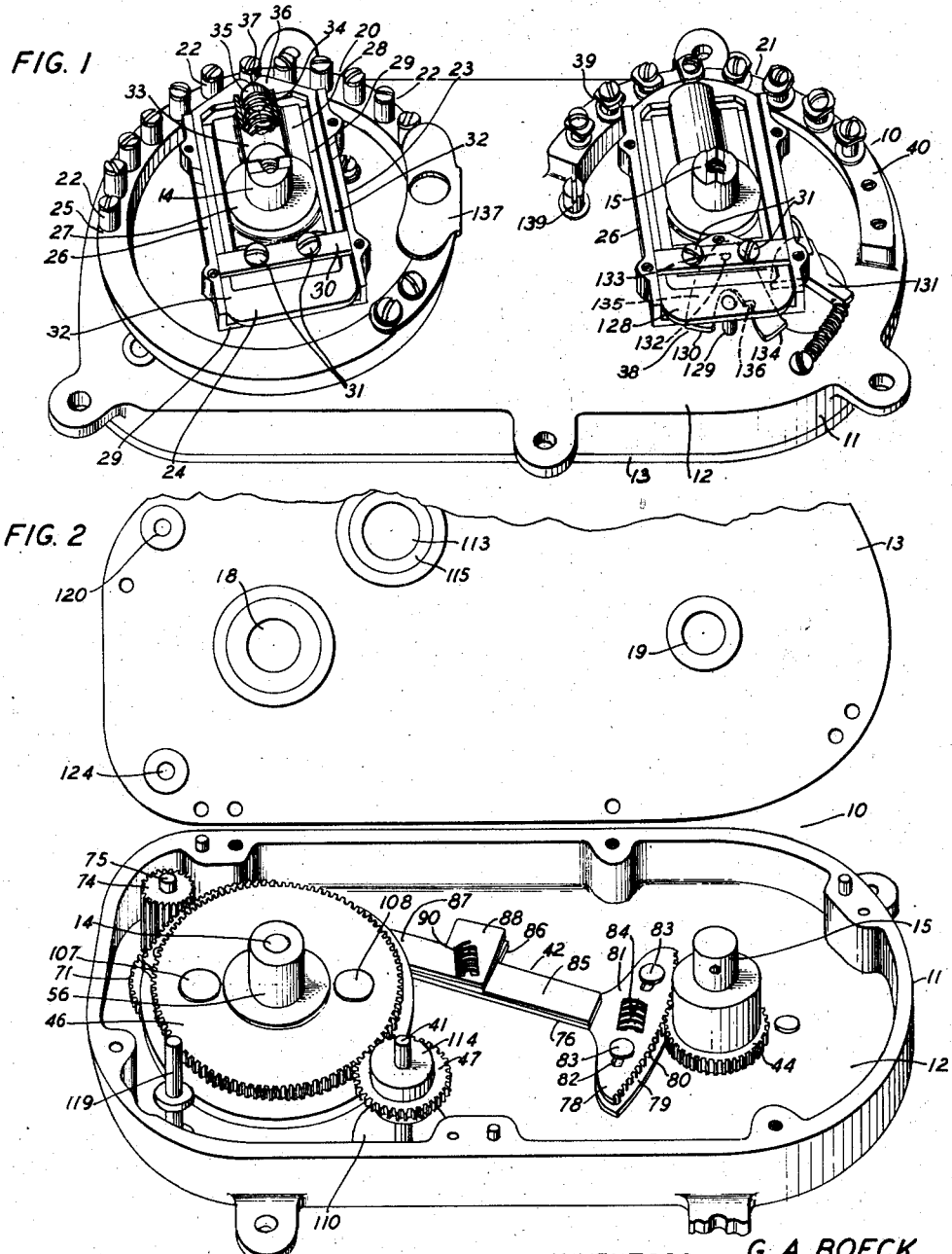
INVENTORS G. A. BOECK
EDSON J. HOWARD
BY J. MacDonald
ATTORNEY

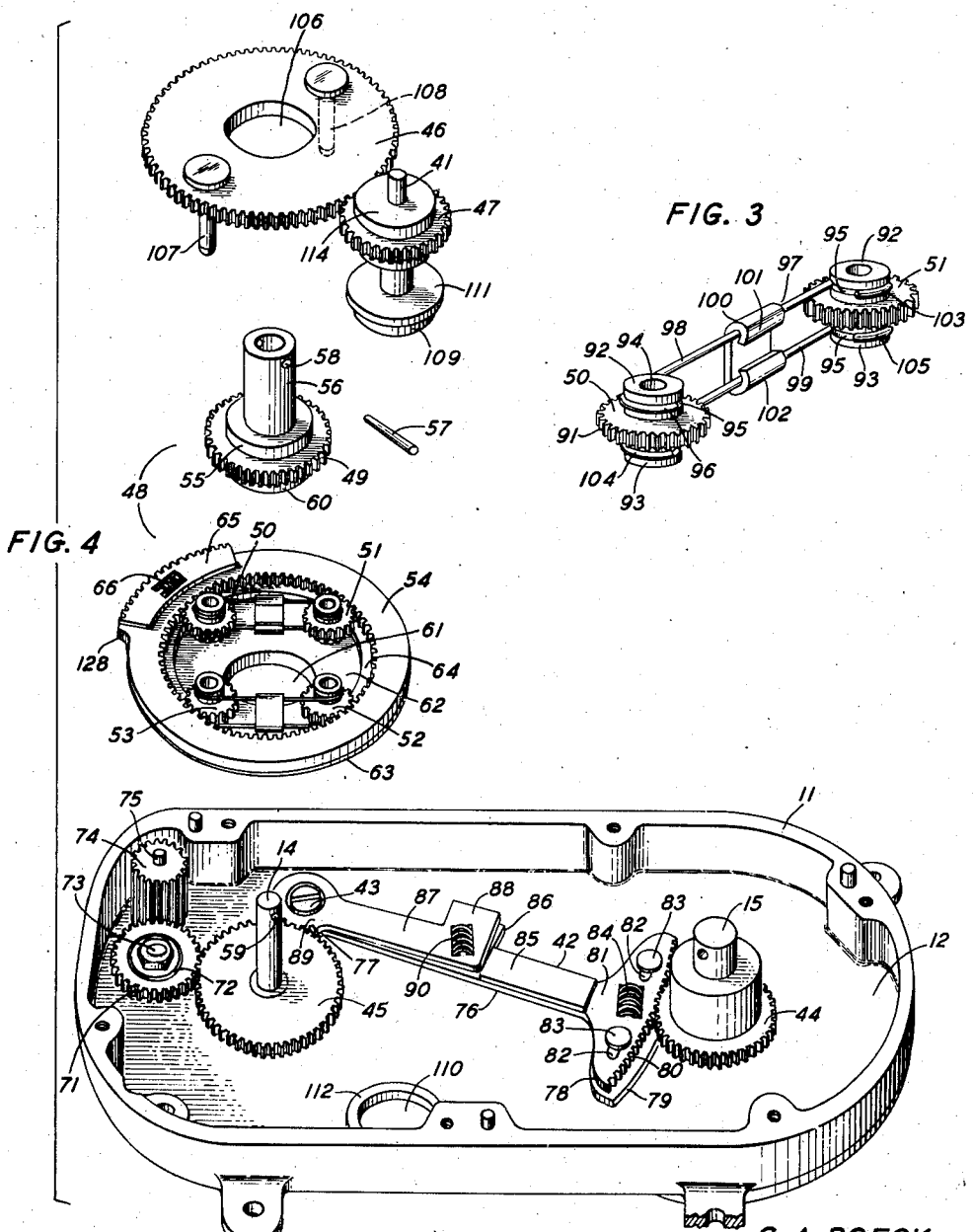

Aug. 16, 1949.　　　G. A. BOECK ET AL　　　2,479,465
CONTROL DEVICE
Filed Jan. 4, 1947　　　　　　　　　　　　　4 Sheets-Sheet 3
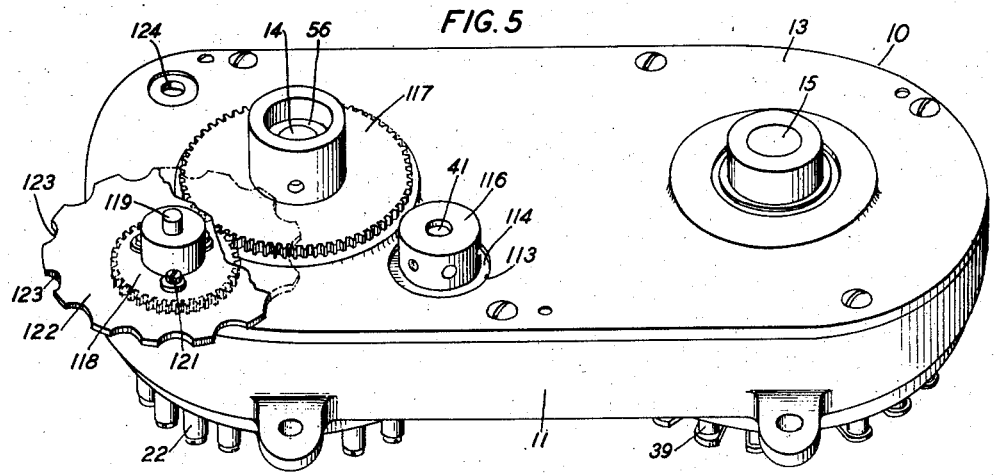
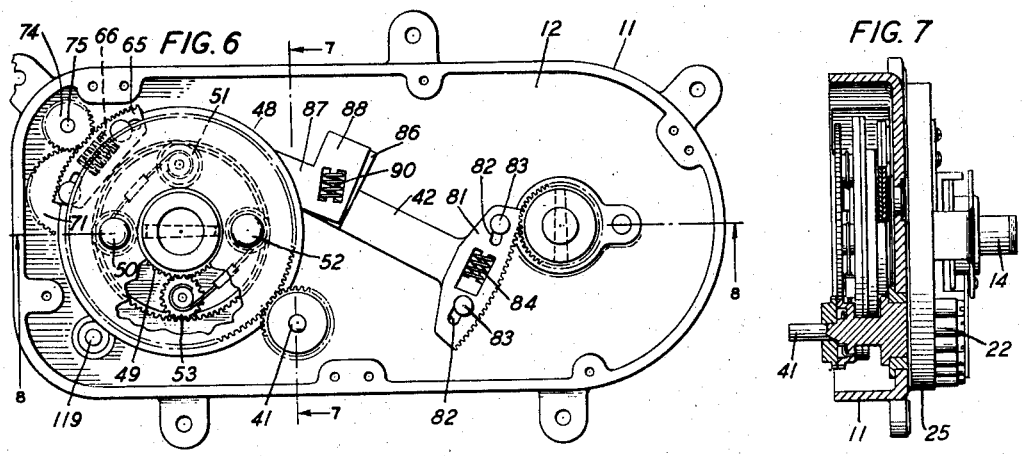
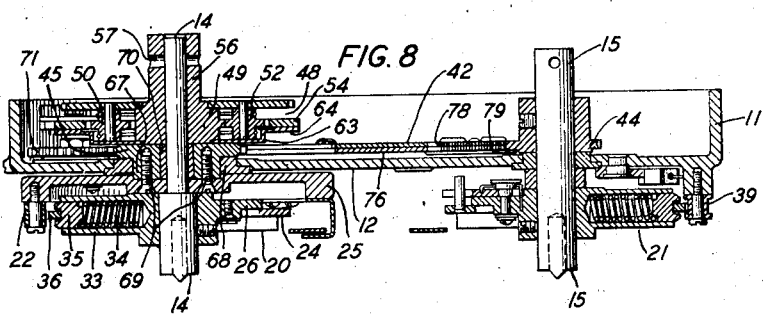
INVENTORS G. A. BOECK
EDSON. J. HOWARD
BY J. MacDonald
ATTORNEY Aug. 16, 1949.　　　G. A. BOECK ET AL　　　2,479,465
CONTROL DEVICE Filed Jan. 4, 1947　　　　　　　　　　　　4 Sheets-Sheet 4

INVENTORS  G. A. BOECK
　　　　　　EDSON J. HOWARD
BY  J. MacDonald
　　　　　　　　　ATTORNEY

Patented Aug. 16, 1949

2,479,465

UNITED STATES PATENT OFFICE 2,479,465

CONTROL DEVICE

Gunther A. Boeck, Mountain Lakes, N. J., and Edson J. Howard, Flushing, N. Y., assignors to Bell Telephone Laboratories, Incorporated, New York, N. Y., a corporation of New York Application January 4, 1947, Serial No. 720,222

3 Claims. (Cl. 74—10.52)

This invention relates to control devices and more particularly to control devices operable to control a plurality of rotatable members such for instance as the rotor shafts of a plurality of variable electrical devices.

An object of the invention is to provide an improved control apparatus by means of which a plurality of rotatable shafts may be differently affected and in accordance with a required program by selecting and operating a control member.

A feature of the invention resides in a mechanical drive forming a power transmitting means between rotatable shafts.

Another feature resides in a releasable detent means.

Another feature resides in a planetary gear means.

In the drawings:

Fig. 1 is a view, in perspective, of a control apparatus embodying the invention and shows the front of a casing-type body;

Fig. 2 is a view, in perspective, taken from the rear of Fig. 1 and with a back cover plate of the casing-type body removed from the body;

Fig. 3 is a view, in perspective, of a planet gear means forming part of the invention;

Fig. 4 shows the body of the control device with certain parts mounted therein and certain other parts of the control device exploded out of the body;

Fig. 5 is a view, in perspective, of the control device and shows the back of the control device;

Fig. 6 is a plan view, in reduced scale, of the control device minus the back cover plate and shows parts mounted in the body;

Fig. 7 is a view, partly in section, of the control device and taken on the line 7—7 in Fig. 6;

Fig. 8 is a view, partly in section, of the control device and taken on the line 8—8 in Fig. 6.

Figure 9:
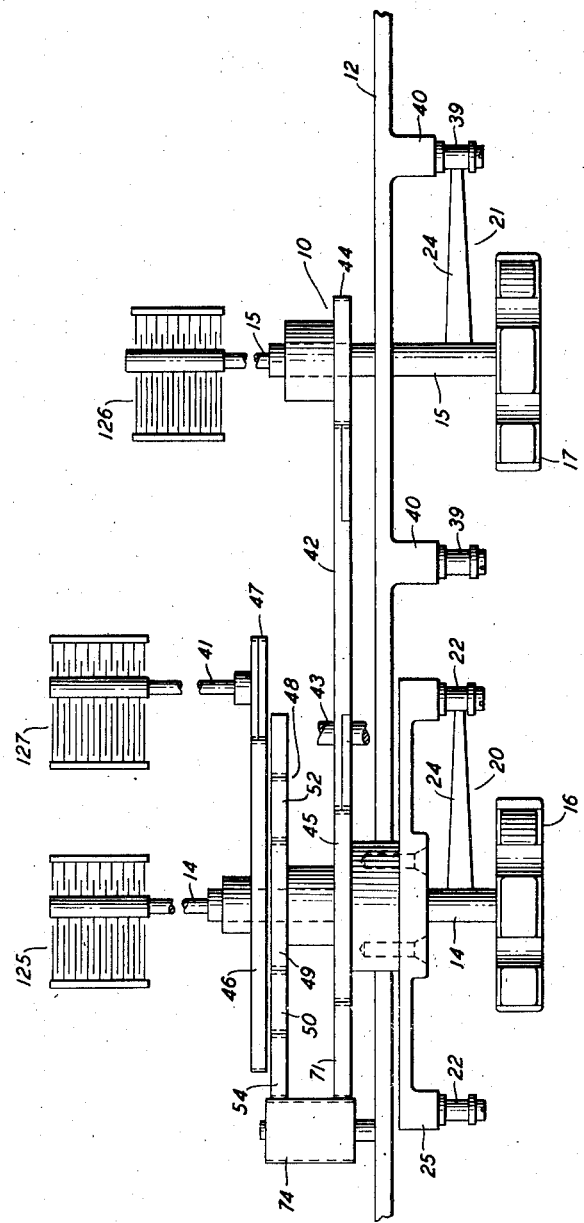
Fig. 9 is a schematic illustration of the control device equipped with manually operable knobs and arranged to control the rotors of a plurality of variable electrical air condensers.

In apparatus involving a plurality of rotatable members required to be rotated to different extents to condition the apparatus for certain requirements it is common practice to provide a separate means for facilitating the rotation of each rotatable member required to be rotated. In such cases several operations are required to condition the apparatus to meet the requirements since each rotatable member must be separately operated. To reduce the number of operations required to rotate a plurality of rotatable members the rotatable members are in some cases arranged for operation by means of a single rotatable shaft common to the plurality of rotatable members, mechanical drives being provided between the single shaft and the rotatable members. When the single shaft is rotated all of the rotatable members in mechanical driving connection therewith are rotated. In some cases the structures and arrangements of the various parts are such that the rotatable members are rotated in different ratios of movement, the ratios of movement are fixed, however, and the same ratios prevail under all rotative movements applied to the parts.

In the present invention the control device may be operated to cause a plurality of rotatable shafts to be operated at different ratios or affected in different manners by suitable selection and operation of a rotatable member in the control device.

In the showing of the invention illustrated in Fig. 9, for instance, two control knobs may be operated to cause three rotatable shafts to be turned at different ratios or affected in different manners, depending on which control knob is turned.

As shown in Fig. 1 the control device 10 comprises a casing type body 11 having an apertured front wall 12 and an apertured rear cover plate 13. Extending through the front wall 12 and the rear cover plate 13 are rotatable shafts 14 and 15 which as shown in Fig. 9 may be equipped with turnable knobs 16 and 17, respectively, to facilitate rotation of the shafts 14 and 15. As shown in Fig. 2 apertures 18 and 19 are formed in the cover plate 13 to accommodate the shafts 14 and 15, respectively.

Detent means 20 and 21, shown in Fig. 1, are provided to normally hold the shafts 14 and 15, respectively, in required adjusted positions and aid an operator in rotating the shafts 14 and 15 in definite required step-by-step rotational movements. The detent means 20 comprises a set of spaced studs 22 and a latch means 23 having a slidable member 24 operable to selectively engage the studs 22. The studs 22 are arcuately arranged and mounted on a cup-type support 25 arranged outside the body 11 and extend normal to the front face of the body 11. The slidable member 24 is frame-like in form and is slidably supported in a mounting 26 which is channel-shaped in cross-section and has an apertured boss portion 27 extending from a block portion 28 formed on a base wall 29 of the mounting 26. The apertured boss portion 27 is apertured to accommodate the shaft 14 and is secured to the shaft 14 by a set screw or other suitable securing means, not shown. A retainer bar 30 secured by suitable securing means 31 to the block portion 28 of the mounting 26 extends in overlapping relation with side walls 32—32 of the slidable member 24 to retain the slidable member 24 in the mounting 26. Integral with the block portion 28 and extending from the boss portion 27 to one end of the mounting 26 is a hollow cylindrical portion 33 in the bore of which is enclosed a helical spring 34 providing a pressure member for a plunger 35 one end of which bears against the inner edge of an end wall 36 of the slidable member 24, the other end of the plunger 35 being in engagement with an outer end of the helical spring 34. The outer end portion of the end wall 36 of the slidable member 24 is tapered in form and the outer end is recessed and cut through at the base of the recess as shown at 37 to fit partly around a stud 22. The function of the helical spring 34 and the plunger 35 is to constantly urge the slidable member 24 lengthwise of the mounting 26. When the shaft 14 is rotating relative to the cup-type support 25 and the outer end 36 of the slidable member 24 comes into engagement with a stud 22 the slidable member 24 is pressed inwardly toward the shaft 14 and against the action of the spring 34 by reason of the engagement of the outer end 36 with a stud 22. The inward pressure is continued until the recess 37 comes into register with the stud 22 at which point the stud 22 fits into the recess 37 and has a tendency to stop rotation of the shaft 14. Since the outer end 36 of the slidable member 24 is cut through at the base of the recess as shown at 37 the outer end 36 comprises two half portions separated by an opening. The two half portions may be slightly sprung apart. The slidable member 24 and the engaged stud 22 cooperate to tightly latch the shaft 14 against free movement and operate as a detent for the shaft 14. As the recess in the outer end 36 comes into register with a stud the pressure of the slidable member 24 against stud 22 forces the two halves of member 24 apart until all clearances against mounting 26 are eliminated. The detent means 21 for the shaft 15 is constructed somewhat along the general lines of the detent means 20 but does not have the cup-type body 25. A releasable holding means 38 is provided to hold the slidable member 24 from engagement with the studs 39 at required times when free rotation of the shaft 15 is required. The studs 39 correspond in general to the studs 22 but are mounted in spaced relation on a generally semicircular boss 40 on the outer face of the body 11. The detent means 20 and 21 and their particular manners of operation will be subsequently more fully explained.

In addition to the shafts 14 and 15 and which are the main operating shafts of the control device a stub shaft 41 is provided. Gear mechanisms are provided to function as power transmitting means from one shaft to another. The structures and arrangements of the gear mechanisms are such that by rotating one shaft a plurality of shafts may be caused to rotate in different degrees or be unaffected as required.

As shown in Fig. 9 a rocker arm 42 pivotally supported at 43 extends between a gear 44 secured to shaft 15 and a gear 45 supported on shaft 14. The rocker arm 42 forms part of a power transmitting means from the shaft 15 to the shaft 14. A power transmitting means is also provided between the shaft 14 and the shaft 41 comprising a plate gear 46 supported on shaft 14 and a pinion gear 47 secured to shaft 41. By reason of the construction and arrangement of the various gear drive mechanisms and the detents provided in the control device the following results may be attained:

1. When the shaft 15 is held against rotation and shaft 14 is rotated one complete turn, shaft 41 will be rotated a fraction of a turn and shaft 15 will not be rotated.
2. When shaft 15 is rotated one complete turn, shaft 14 will be rotated a fraction of a turn and shaft 41 will not be rotated.

In an actual set-up of the control device and with the various gears and the rocker arm suitably dimensioned, constructed and arranged the following results were attained:

1. When the shaft 15 is held against rotation, by means of its detent 21, and shaft 14 is rotated one complete cyclic turn shaft 41 is rotated ninety-two one hundredths of a turn and shaft 15 is not rotated.
2. When shaft 15 is rotated one complete cyclic turn shaft 14 is rotated one-tenth of a turn and shaft 41 is not rotated.

A planetary gear drive 48 comprising a sun gear 49, paired planet gears 50 and 51 and 52 and 53 and a ring gear 54 are provided in the control device. The sun gear 49, as shown in Fig. 4, is integral with or is secured on an enlarged portion 55 of a tubular shaft 56 through the bore of which the shaft 14 may extend, the shaft 14 and the tubular shaft 56 being secured against relative rotation by means of a pin 57 extending through a transverse aperture 58 in the tubular shaft 56 and a transverse aperture 59 in the shaft 14. The lower end 60 of the tubular shaft 56 is dimensioned to fit into an aperture 61 formed in the center of a recessed portion 62 of a plate 63, the flange 64 of which is wider than the ring gear 54, the outside diameter of the plate 63 being equal to the outside diameter of the ring gear 54, the teeth of the ring gear 54 being on the inside of the ring gear 54. A segment gear comprising a toothed enlargement 138 on the ring gear 54 and an overlying and apertured toothed segment plate 65, shiftable relative to the enlargement 138 against the action of a spring 66, are provided as an anti-backlash gear portion on the ring gear 54. The plate 63 is designed to rest on the gear 45 shown in Fig. 4, the gear 45 as shown in Fig. 8 having a hub portion 67 journalled in a flanged bearing 68 supported in an apertured portion of the front wall 12 of the body 11. The hub portion 67 of the gear 45 is secured by means of screws 69 to the cup-type support 25 of the detent means 20. The shaft 14 is journalled in a bearing 70 in the gear 45.

The gear 45 may rotate on the shaft 14 and is in mesh with an idler gear 71 rotatably supported on a bearing 72 supported on a bolt 73 mounted in the body 11. The idler gear 71 is in mesh with a relatively wide pinion 74 rotatably supported on a shaft 75 mounted in the body 11. The pinion 74 is in mesh with the toothed enlargement 138 and the toothed segment plate 65 on the ring gear 54.

The rocker arm 42 is T-shaped in form and serves as a mechanical driving means between the gear 44 secured on the shaft 15 and the gear 45 rotatably mounted on the shaft 14. One end of the body portion 76 of the rocker arm 42 terminates in an apertured, enlarged and circular end portion 77 forming the pivotally supported end of the rocker arm 42. The other end of the body portion 76 terminates in the cross-arm portion 78 carrying an attached segment plate 79 extending under the gear 44. The cross-arm portion 78 is constructed to provide an anti-backlash gear segment 80 in mesh with the gear 44, the anti-backlash gear segment 80 comprising the cross-arm portion 78 equipped with teeth, and a second segment 81 equipped with teeth and overlying the cross-arm portion 78. The second segment 81 is shiftable on and relative to the cross-arm portion 78 and is provided with elongated apertures 82 accommodating mounting pins 83 mounted on the cross-arm portion 78 and extending through the second segment 81. A spring 84 is provided to constantly urge the second segment 81 lengthwise and relative to the cross-arm portion 78 to prevent lost motion between the gear 44 and the rocker arm 42.

Secured to and overlying the body portion 76 of the rocker arm 42 is a bar 85 having an apertured enlargement 86. Overlying the bar 85 is an apertured arm 87 pivotally supported at 43 and having an apertured enlargement 88. The pivotally supported end of the bar 87 has a gear portion 89 the teeth of which are in mesh with the gear 45. A spring 90 engaging the apertured enlargements 86 and 88 urges the bar 87 relative to the rocker arm 42 to prevent lost motion between the rocker arm parts and the gear 45.

When the shaft 15 is rotated the gear 44 pivotally moves the rocker arm 42 to rotate the gear 45 which is in driving connection with the ring gear 54 through the gear 71, pinion 74 and segment portion 138 and plate 65 on the ring gear 54. If the shaft 15 is held against rotation the ring gear 54 and the gear 45 cannot rotate.

The sun gear 49 in the planetary gear means 48 is constructed and arranged to mesh with the planet gears 50, 51, 52 and 53 which are arranged in pairs and to mesh with the teeth on the inner circular part of the ring gear 54. The paired arrangement of the planet gears is clearly shown in Fig. 3 which shows one pair of the planet gears comprising the planet gears 50 and 51 supported in spaced relation. The planet gears are constructed alike and the description of one will be sufficient for an understanding of the structure of all. The planet gear 50 comprises a gear wheel portion 91 having apertured hub portions 92 and 93 extending from opposite faces of the portion 91 and defining an aperture 94. Each hub portion 92 and 93 has an annular groove 95 formed in the outer cylindrical surface to receive a hook-shaped end 96 of a spring wire support 97 comprising a pair of spring wires 98 and 99 held in parallel spaced relation by a clip 100, end portions 101 and 102 of which are bent around the respective spring wires 98 and 99. One end of the spring wire 98 extends into the groove 95 in the hub portion 92 of the planet gear 50 and the hook portion 96 is made to loosely embrace the hub portion 92 and so that the hub portion 92 is in effect, journalled in the hook portion 96. The other end of the spring wire 98 extends into the groove 95 in the hub portion 92 of the planet gear 51 and has a hook portion 103 located in the groove 95 and loosely embracing the hub portion 92 of the planet gear 51. The spring wire 99 is formed like the spring wire 98 and has hook-shaped end portions 104 and 105, the hook-shaped end portion 104 loosely embracing the hub portion 93 of the planet gear 50 and the hook-shaped end portion 105 loosely embracing the hub portion 93 of the planet gear 51, each hook-shaped end portion resting in a groove 95 in the hub portion embraced. It will be seen as shown in Fig. 3 that the planet gears 50 and 51 are held in spaced relation by the spring wires 98 and 99 and that normally the major portions of the spring wires 98 and 99 extend in straight lines from the planet gear 50 to the plant gear 51. The planet gears 52 and 53 are constructed and mounted on spring wire members 98 and 99 in the same manner as the planet gears 50 and 51. The distance from center to center of a pair of planet gears mounted on the spring wires 98 and 99, the diameter of the sun gear 49 and the inside diameter of the ring gear 54 are such that when the planet gears 50, 51, 52 and 53 are set into the ring gear 54 as shown in Fig. 4 and the sun gear 49 is entered in the ring gear 54 in required position as shown in Fig. 6 the spring wire supports of the planet gears involving the spring wires 98 and 99 are bowed slightly outward relative to the axis of the sun gear 49. The spring pressure developed in the spring wires 98 and 99 by reason of the bowing thereof helps to keep the planet gears 50, 51, 52 and 53 in true mesh with the ring gear 54 and the sun gear 49 and ring gear 54 in the same position in regard to each other, thus eliminating backlash between them.

The plate gear 46 has a central aperture 106 to accommodate the enlarged portion 55 on the shaft portion 56 of the sun gear 49. The plate gear 46 is rotatably supported on the sun gear 49 and is equipped with spaced pins 107 and 108 diametrically disposed and extending normal to the plane of the lower face of the plate gear 46. The pins 107 and 108 are constructed to extend into the planet gears, one pin being arranged to extend into the bore of a planet gear in one pair and the other pin being arranged to extend into the bore of a planet gear of the other pair. The planet gear receiving a pin may rotate on the pin. The pin 107 may be set into the bore 94 of the planet gear 53 and the pin 108 may be set into the bore of the planet gear 51. When the planet gears are rotated while the ring gear 54 is held against rotation the planet gears will, in effect, walk around inside the ring gear 54 and cause the plate gear 46 to rotate. The plate gear 46 is in mesh with the gear 47 on the stub shaft 41 an enlarged flanged end portion 109 of which is constructed and arranged to freely fit into an aperture 110 formed in the front wall 12 of the casing-type body 11, the flange 111 on the stub shaft 41 being constructed and arranged to bear against a bearing surface 112 formed or provided on the wall 12 of the body 11. The stub shaft 41 is arranged to extend through an aperture 113 in the cover plate 13 and an enlargement 114 on the stub shaft 41 is provided to extend into a recess 115 in the cover plate 13.

As shown in Fig. 5 a collar or coupling 116 may be secured to the shaft 41 and a gear 117 may be mounted on and secured to the tubular shaft 56, the collar 116 and the gear 117 being exterior of the cover plate 13. The gear 117 is in mesh with a gear 118 mounted on a stub shaft 119 which extends through an aperture 120 in the cover plate 13 and into the body 11. The stub shaft 119 is rotatably mounted in the front wall 12 and cover plate 13 of the casing. The gear 118 is secured by suitable means 121 to a disc 122 having notches 123 formed in its outer edge. The disc 122 may be used to drive some rotatable part exterior of the casing and not shown in the drawings. The aperture 124 in the cover plate 13 is provided to accommodate one end of the shaft 75 of the pinion 74.

As shown in Fig. 9 the shafts 14, 15 and 41 may serve as or be connected to rotatable parts of electrical devices shown merely for example as being variable electrical air condensers 125, 126 and 127, the shafts 14, 15 and 41 serving as means to cause rotation of the rotor elements of the condensers 125, 126 and 127, respectively.

When the detent means 21 for shaft 15 is in such condition that the slidable member 24 therein is in engagement with a stud 39 and shaft 14 is rotated shaft 41 will be rotated but to a lesser degree than shaft 14 by reason of the operation of parts of the control device as follows and the gear ratios of the gear drives comprising the sun gear 49, the planet gears 50, 51, 52 and 53, the ring gear 54, the plate gear 46 and the gear 47 on the shaft 41. Rotation of the shaft 14 causes rotation of the sun gear 49 which rotates the planet gears 50, 51, 52 and 53 and which walk around in the ring gear 54 since the ring gear 54 is held against rotation through the held shaft 15, the rocker arm 42, gear 45, gear 71 and pinion gear 74 in mesh with the segment gear portion 138 and segment gear plate 65 on the ring gear 54. The planet gear pairs involving the planet gears 50, 51, 52 and 53 drive the plate gear 46 to rotate the gear 47 and shaft 41 since the pins 107 and 108 extend into hubs in the planet gears, pin 107 extending into the hub of a planet gear in one pair and pin 108 extending into the hub of a planet gear in the other pair.

Shaft 15 may be rotated to cause the ring gear 54 to rotate to change the effect of the planetary gear system with regard to the shafts 14 and 41. When the shaft 15 is rotated gear 44 is rotated to drive the rocker arm 42. The pivotal end of the rocker arm 42 through its gear teeth drives the gear 45 to rotate gear 71 which in turn rotates the pinion gear 74 to rotate the ring gear 54. Gear 45 is attached to the cup-type support 25 carrying the studs 22 one of which may be in engagement with the slidable member 24 on the detent device 20. In this case when the gear 45 is rotated the cup-type support 25 is rotated and the stud 22 thereon in engagement with the slidable member 24 rotates the slidable member 24 and the rectangular support 26 attached to the shaft 14. The shaft 14 is therefore rotated through its detent means 20 when gear 45 is rotated. The pivotal point of support 43 of the rocker arm 42 is relatively far from the gear 44 and relatively near to the gear 45 and due mainly to this fact the rotation of the shaft 14 will be small as compared with the rotation of the shaft 15. Gear 45 in rotating causes idler gear 71 to rotate and this in turn rotates the pinion 74 to cause rotation of the ring gear 54. Rotation of the shaft 14 causes rotation of the sun gear 49 in mesh with the planet gears 50, 51, 52 and 53. If the ring gear 54 is rotating while the planet gears 50, 51, 52 and 53 are rotating the effect of the planet gears on the plate gear 46 will be different from the effect when the ring gear 54 is stationary. The gear ratios in the planetary gear system may be such that when the ring gear 54 and the planet gears 50, 51, 52 and 53 are rotating in a required manner the planet gears 50, 51, 52 and 53 will not walk around in the ring gear 54 and the plate gear 46 will not be rotated. Under this condition the gear 47 and shaft 41 will not be rotated.

If the shafts 14, 15 and 41 are in individual driving connection with the rotors of the variable condensers 125, 126 and 127, respectively the rotors of the variable condensers will be rotated in accordance with the rotations of the respective shafts 14, 15 and 41.

As above mentioned the detent means 21 for the shaft 15 does not have the cup-type support 25, the studs 39 being mounted on a boss 40 on the wall 12 of the body 11. A releasable holding means 38 is provided to withdraw and hold the slidable member 128 from engagement with the studs 39. The slidable member 128 except for the inclusion therein of a pin 129 is constructed similar to the slidable member 24 in the detent means 20. The slidable member 128 may be retracted from a position of engagement with the studs 39 and may be latched in retracted position. A spring-loaded cam 130 and a spring-loaded lever 131 are provided for this purpose. The spring-loaded cam 130 is V-shaped and is pivotally supported on a pin 132 mounted in the support 26. Around the pin 132 a spring 133 is supported to spring load the cam 130. Legs 134 and 135 of the spring-loaded cam 130 extend on opposite sides of the pin 129 on the slidable member 128 and a notch 136 is formed in the leg 134. The pin 129 may be brought into engagement with the spring-loaded lever 131. When shaft 15 is rotated counter-clockwise beyond the last detent stud 39, pin 129 engages with spring-loaded lever 131 which forces pin 129 and slidable member 128 in a direction away from the studs 39, permitting spring-loaded cam 130 pivoting on pin 132 to pivotally move to bring the notch 136 on the leg 134 behind pin 129 thereby holding slidable member 128 in an off detent position until rotated to the extreme clockwise position where spring-loaded cam 130 strikes a fixed post 139 and pivotally moves, releasing its hold on pin 129, permitting the spring 34 to thrust the slidable member 128 to a position for engagement with the studs 39. This control device may be arranged so that when shaft 15 is rotated over all of its detent studs 39, shaft 14 with its cup-type support 25 and detent studs 22 will rotate nine-tenths of the distance between two detent studs 22. In order that the proper index may be read directly an indexing mask 137 is fastened to the cup-type support 25 so as to block out adjacent indexes.

This control device contains a ready interchangeable feature where several similar cup-type supports 25 containing different numbers of detent studs 22 may be interchanged by inserting in required relation with its respective rocker arm 42. Maximum flexibility is obtained by changing the shaft location of the rocker arm 42 without changing the other gears in the device or the decimal relation of shaft 15 to shaft 14.

What is claimed is:

1. A control device comprising a first rotatable shaft, a second rotatable shaft, a third rotatable shaft, a rotatable detent means on said first shaft, a planetary gear means supported on said first shaft, said planetary gear means forming a power transmitting means between said first shaft and said third shaft and gear means comprising a rocker arm forming a power transmitting means between said second shaft and said detent means and cooperating with said detent means to form a power transmitting means between said second shaft and said first shaft.

2. A control device comprising a first rotatable shaft, a second rotatable shaft, a third rotatable shaft, detent means rotatably supported on said first shaft and having a part secured to said first shaft, a plentary gear means supported on said first shaft and forming a power transmitting means between said first shaft and said third shaft, gear means comprising a rocker arm forming a power transmitting means between said second shaft and said detent means to transmit rotations of said second shaft to said first shaft and holding means for said second shaft to prevent rotation of said second shaft at required times.

3. A control device comprising a first rotatable shaft, a second rotatable shaft, a third rotatable shaft, a sun gear secured to said first shaft, a ring gear rotatable relative to said sun gear, paired planet gears in mesh with said sun gear and said ring gear, a plate gear carried on said paired planet gears and in driving connection with said third shaft, a rocker arm in gear connection with said second shaft and said ring gear and operable as a control means between said second shaft and said ring gear, said second shaft being operable through said rocker arm to rotate said ring gear and to hold said ring gear against rotation and releasable holding means for said second shaft.

GUNTHER A. BOECK.
EDSON J. HOWARD.

REFERENCES CITED

The following references are of record in the file of this patent:

UNITED STATES PATENTS

| Number | Name | Date |
|---|---|---|
| 1,728,834 | Langley | Sept. 17, 1929 |
| 1,833,235 | Slocumb | Nov. 24, 1931 |
| 1,939,856 | Langley | Dec. 19, 1933 |
| 2,016,149 | Lench | Oct. 1, 1935 |
| 2,288,406 | Kimball | June 30, 1942 |